(12) United States Patent
Nedbal et al.

(10) Patent No.: US 8,572,014 B2
(45) Date of Patent: Oct. 29, 2013

(54) PATTERN RECOGNITION USING TRANSITION TABLE TEMPLATES

(75) Inventors: Manuel Nedbal, Santa Clara, CA (US); Sachin Kajekar, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 811 days.

(21) Appl. No.: 12/580,438

(22) Filed: Oct. 16, 2009

(65) Prior Publication Data
US 2011/0093694 A1 Apr. 21, 2011

(51) Int. Cl.
G06F 17/00 (2006.01)
G06N 5/00 (2006.01)

(52) U.S. Cl.
USPC .............................. 706/45; 715/210; 713/150

(58) Field of Classification Search
USPC ............................................................ 706/45
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 2003/0085831 A1* | 5/2003 | Lavoie | 342/13 |
| 2005/0114700 A1 | 5/2005 | Barrie et al. | |
| 2007/0088955 A1 | 4/2007 | Lee et al. | |
| 2007/0233628 A1 | 10/2007 | Sherwood et al. | |
| 2010/0049713 A1* | 2/2010 | Ichino | 707/6 |
| 2010/0266215 A1* | 10/2010 | Hua et al. | 382/229 |

FOREIGN PATENT DOCUMENTS

WO  WO 2011/047292 A2  4/2011

OTHER PUBLICATIONS

Notification of Transmittal of the International Search Report and the Written Opinion of the International Searching Authority, or the Declaration for PCT/US2010/052886 dated Jun. 29, 2011, 9 pages.
Aho, A. J. and Corasick M. J. "Efficient String Matching: An Aid to Bibliographic Search," Communications of the ACM, Jun. 1975, vol. 18, No. 6, pp. 333-340.
Kong, S., Smith, R., and Estan, C. "Efficient Signature Matching With Multiple Alphabet Compression Tables," SecureComm 2008, Sep. 22-25, 2008, Istanbul, Turkey, 10 pages.
Rejeb, J. and Srinivasan, M. "Extension of Aho-Corasick Algorithm to Detect Injection Attacks," Advances in Computer and Information Sciences and Engineering, pp. 207-212, Springer Science+Business Media B.V. 2008.
PCT, International Preliminary Report on Patentability, issued Apr. 17, 2012, and Written Opinion mailed Jun. 29, 2011, International Application No. PCT/US2010/052886, 6 pages.

* cited by examiner

*Primary Examiner* — Kakali Chaki
*Assistant Examiner* — Kalpana Bharadwaj
(74) *Attorney, Agent, or Firm* — Patent Capital Group (57) ABSTRACT

Methods, systems, and apparatus, including computer programs encoded on computer storage media, for using transition table templates. In one aspect, a method includes receiving a transition table for a current state of a finite automaton and determining whether the transition table for the current state is similar to a transition table template in a set of transition table templates. The method further includes generating a condensed representation of the transition table if the transition table is similar to a transition table template and otherwise adding the transition table to the set of transition table templates. In another aspect, a method includes receiving an input element and determining whether a next state corresponding to the input element is in the difference region of a condensed transition table. The method further includes retrieving the next state from the difference region, or a transition table template, based on the determination.

22 Claims, 8 Drawing Sheets

```
              Input Elements
Current State
              |   | a | b | c | d |
       210 →  | 1 | 4 | 3 | 4 | 4 |
       212 →  | 2 | 4 | 2 | 2 | 4 |
       214 →  | 3 | 4 | 1 | 2 | 4 |
       216 →  | 4 | 4 | 4 | 4 | 4 |
```

FIG. 2B

```
              Input Elements
Current State
              |   | a | b | c | d |
       210 →  | 1 | 4 | 3 | 4 | 4 |
       212 →  | 2 | 4 | 2 | 2 | 4 |
       214 →  | 3 | 4 | 1 | 2 | 4 |
       216 →  | 4 | 4 | 4 | 4 | 4 |
```

FIG. 2C

| 228 → | | a | b | c | d |
|---|---|---|---|---|---|
| | template 1 | 4 | 3 | 4 | 4 |

| | | | Difference Region | Difference Table |
|---|---|---|---|---|
| 220 → | 1 | template 1 | | |
| 222 → | 2 | template 1 | b-c | 2,2 |
| 224 → | 3 | template 1 | b-c | 1,2 |
| 226 → | 4 | template 1 | b | 4 |

PATTERN RECOGNITION USING TRANSITION TABLE TEMPLATES

BACKGROUND

This specification relates to pattern recognition using finite automata.

Pattern recognition, or pattern matching, is used in a variety of applications, including network security. For example, network security problems can be identified by analyzing network traffic for patterns matching malicious traffic. The particular protocols used between ports of devices on a network can be determined by analyzing network traffic for patterns matching known port protocols. Pattern matching can also be used in file security analysis by matching the data of a file to patterns indicating malicious file contents.

Pattern matching can be done using finite automata (e.g., finite state machines). A finite automaton includes a number of states, transitions between the states, and particular actions corresponding to the states (e.g., determine that the input matches a pattern, determine that the input does not match a pattern, etc.). For example, the Aho-Corasick finite automaton algorithm is used to match patterns in input text strings.

Implementing a finite automaton requires storing transitions for every possible next input element that could be received for every possible current state that the finite automaton could be in. Therefore, a large amount of storage space is needed to store the transitions for a finite automaton—the storage requirements are on the order of magnitude of number of states multiplied by the number of possible input elements. This can make storing, and using, finite automata inefficient.

SUMMARY

This specification describes technologies relating to pattern recognition using transition table templates.

In general, one aspect of the subject matter described in this specification can be embodied in methods that include the actions of receiving, in a data processing apparatus, a transition table for a current state of a finite automaton, the finite automaton configured to match patterns in input data, the transition table storing, for each possible next element in the input data, a corresponding next state of the finite automaton; determining, with the data processing apparatus, whether the transition table for the current state is similar to any transition table template in a set of transition table templates, each transition table template being a transition table for a respective different state of the finite automaton, where the transition table is similar to a transition table template when a difference region for the transition table and the transition table template has a size satisfying a threshold, the difference region being a contiguous region in the transition table containing all next states that are different from the corresponding next states in the transition table template; in response to determining that the transition table is similar to a transition table template in the set of transition table templates, generating, with the data processing apparatus, a condensed representation of the transition table, the condensed representation including a reference to the similar transition table template, an identification of the difference region, and the next states in the difference region of the transition table; and in response to determining that the transition table is not similar to any transition table template in the set of transition table templates, adding, in the data processing apparatus, the transition table to the set of transition table templates. Other embodiments of this aspect include corresponding systems, apparatus, and computer programs recorded on computer storage devices, each configured to perform the operations of the methods.

These and other embodiments can each optionally include one or more of the following features. Determining whether the transition table for the current state is similar to any transition table template can further include selecting a transition table template from the plurality of transition table templates, the selected transition table template being the transition table template for which the transition table for the current state has the smallest difference region; and determining whether the size of the difference region for the transition table and the selected transition table template satisfies the threshold. The transition table for the current state can be indexed according to a deterministic indexing scheme, where next states are indexed according to indices associated with input data elements. Determining whether the transition table for the current state is similar to any transition table in the set of transition table templates can include for a particular transition table template identifying a lowest index in the transition table having a corresponding next state that is different from a next state stored at the lowest index in the particular transition table template; identifying a highest index in the transition table having a corresponding next state that is different from a next state stored at the highest index in the particular transition table template; and determining that the transition table is similar to the particular transition table template if the difference between the highest index and the lowest index satisfies a threshold. The identification of the region of differences can comprise an identification of the lowest index and the highest index.

The input data can correspond to network traffic. The patterns can be character strings indicative of a prohibited process. The patterns can be associated with network protocols. The input data can correspond to a stream of characters generated while scanning a file.

In general, another aspect of the subject matter described in this specification can be embodied in methods that include the actions of storing, in a data processing apparatus, a current state of a finite automaton and a condensed transition table for the current state, the finite automaton configured to match patterns in input data, the condensed transition table indicating, for each possible next element in the input data, a corresponding next state of the finite automaton, the condensed representation including a reference to a transition table template, an identification of a difference region for the transition table and the transition table template, and a difference table storing the next states of the difference region of the transition table, where the difference region is a contiguous region in the transition table containing all next states that are different from the corresponding next states in the transition table template; receiving, in the data processing apparatus, an input element; determining, with the data processing apparatus, a next state for the finite automaton, the determining including: determining whether a next state corresponding to the input element is in the difference region; in response to determining that the next state corresponding to the input element is not in the difference region, retrieving the next state from the transition table template; and in response to determining that the next state corresponding to the input element is in the difference region, retrieving the next state from the difference table; and updating the current state of the finite automaton to be the next state. Other embodiments of this aspect include corresponding systems, apparatus, and computer programs recorded on computer storage devices, each configured to perform the operations of the methods.

These and other embodiments can each optionally include one or more of the following features. The transition table, the transition table template, and the difference table can each be indexed according to a deterministic indexing scheme, where next states are indexed according to indices associated with input elements. The identification of the difference region can include a lowest index in the transition table having a corresponding next state that is different from a next state stored at the lowest index in the transition table template, and a highest index in the transition table having a corresponding next state that is different from a next state stored at the highest index in the transition table template. Determining whether a next state corresponding to the input element is in the difference region can comprise determining whether an index corresponding to the input element is between the lowest index and the highest index. Retrieving the next state from the transition table template can comprise retrieving the next state from the transition table template at the index corresponding to the input element. Retrieving the next state from the difference table can comprise retrieving the next state from the difference table at an index corresponding to the difference between the index corresponding to the input element and the lowest index.

The method can further include receiving input data, the input data compressed according to a compression scheme; decompressing the input data; and identifying the input element from the decompressed input data. The method can further include receiving input data encrypted according to an encryption scheme; decrypting the input data; and identifying the input element from the decrypted input data.

The method can further include determining that the next state indicates that the input data matches a predefined pattern; and in response to the determination, initiating a protection process on a source of the input data. The method can further include terminating processing of the input data in response to the determination. The method can further include determining from the next state that the input data does not match any of a group of predefined patterns represented by the finite automaton; and in response to the determination, terminating processing of the input data.

In general, another aspect of the subject matter described in this specification can be embodied in an article of manufacture, comprising a computer readable medium; and information stored in the computer readable medium that, when processed by a computer, defines a data structure storing a condensed representation of a transition table for a current state of a finite automaton, the finite automaton configured to match patterns in input data, the transition table including, for each possible next element in the input data, a corresponding next state of the finite automaton, the data structure comprising: a reference to a transition table template for the transition table; an identification of a difference region for the transition table and the transition table template, the difference region being a contiguous region in the transition table containing all next states that are different from the corresponding next states in the transition table template; and the next states corresponding to the difference region in the transition table.

These and other embodiments can each optionally include one or more of the following features. The transition table for the current state can be indexed according to a deterministic indexing scheme, where next states are indexed according to indices associated with input data elements. The identification of the difference region can include a lowest index in the transition table having a corresponding next state that is different from a next state stored at the lowest index in the transition table template and a highest index in the transition table having a corresponding next state that is different from a next state stored at the highest index in the transition table template.

Particular embodiments of the subject matter described in this specification can be implemented so as to realize one or more of the following advantages. The transition tables for finite automata can be represented with reduced storage overhead. The reduced storage overhead means that more transition tables can be stored in smaller but faster caches. This improved caching can increase the performance of a pattern matching algorithm. The condensed representations can be used to identify the next state of a finite automaton with close to zero increase in performance overhead. The reduced storage overhead further allows for searching larger number of patterns.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Example Operating Environments

Figure 1A:
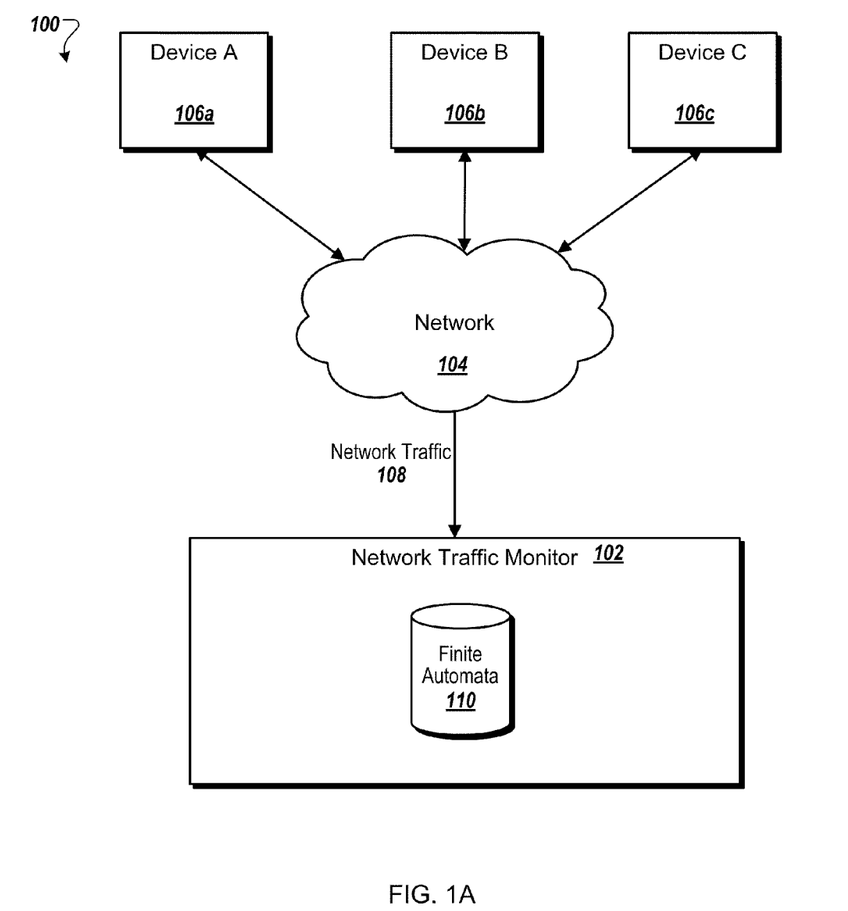
FIGS. 1A and 1B illustrate example operating environments in which pattern matching can be used to analyze network traffic and file contents.
Figure 1B:
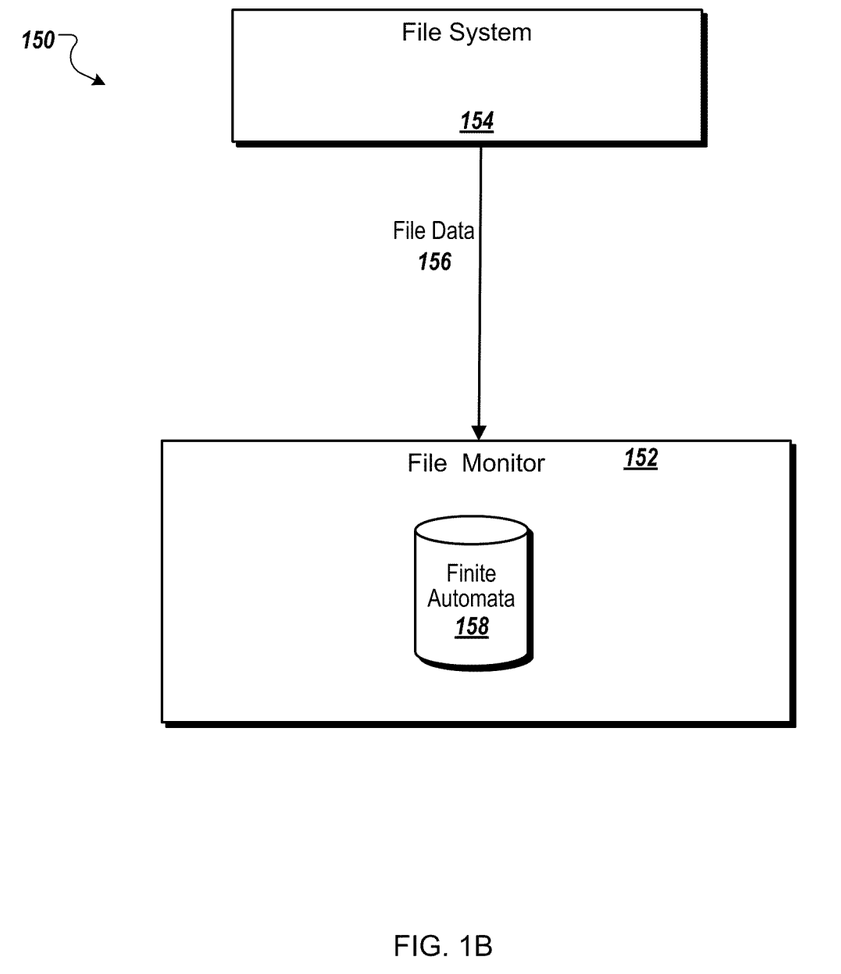

FIGS. 1A and 1B illustrate example operating environments 100 and 150 in which pattern matching can be used to analyze network traffic and file contents.

FIG. 1A is a block diagram of an example environment 100 in which network traffic is monitored by a network traffic monitor 102. A computer network 104, e.g., a local area network (LAN), wide area network (WAN), the Internet, or a combination thereof, connects devices (e.g., Device A 106a, Device B 106b, and Device C 106c) to each other, and optionally to other networks.

Each device 106 is an electronic device that is capable of requesting and receiving resources over the network 104. Example client devices include servers, personal computers, mobile communication devices, and other devices that can send and receive data over the network 104.

The network traffic monitor 102 receives network traffic 108. The network traffic monitor 102 can receive the network traffic 108 as bit streams or as a stream of packets. A bit stream is a stream of bits corresponding to a particular communication over the network. Packets are subsets of data corresponding to a particular communication that are formatted according to a specific format. The network traffic monitor 102 can receive packets for multiple communications at the same time, sort them according to the communications to which they correspond, and reconstruct the communication by combining the data in the packets. In some implementations, the network data is encrypted, compressed, or both, e.g., according to conventional encryption and compression techniques. In these implementations, the network traffic monitor 102 can decrypt or de-compress the network data, as appropriate, for example, using conventional techniques.

The network traffic monitor 102 can be deployed in-line (i.e., the monitor 102 receives all network traffic for monitoring, and allows (or disallows) portions of the network traffic to pass through the monitor 102) or deployed as a tap (i.e., the monitor 102 sniffs particular packets or receives all packets in a promiscuous mode). The network traffic monitor 102 processes the network traffic data to identify patterns in the data, for example, using one or more finite automata 110. For example, the network traffic monitor 102 can use finite automata 110 to match the data to suspicious character strings indicative of a prohibited process running on the network, or can use the finite automata to match the traffic to character strings associated with a particular network communication protocol. Example communication protocols include, for example, Hypertext Transfer Protocol (HTTP) and File Transfer Protocol (FTP).

The network traffic monitor 102 then takes various actions based on whether the data matches patterns of interest to the network traffic monitor. For example, when the network traffic monitor determines that a particular communication over the network matches a pattern indicative of a prohibited process running on the network, the network traffic monitor can initiate a protection process on the source of the communication. Example protection processes include disabling network access to the device sending the communication, blocking traffic to a device that is determined to be under attack or compromised, quarantining a device so that traffic is limited to a quarantine sub-network, and/or warning a network administrator that there is suspicious traffic on the network. If the network traffic monitor determines that the traffic does not match any of the patterns represented by the finite automata 110, no protective processes are initiated. When the network traffic monitor determines that a particular communication over the network matches a particular protocol, the network traffic monitor can modify the analysis being performed on network traffic in response to the determination. For example, the network traffic monitor can start an analysis process that is particular to the identified protocol, or can stop running an analysis process that is unnecessary given the identified protocol because the analysis checks for a problem that does not occur with the identified protocol.

FIG. 1B is a block diagram of an example environment 150 in which a file monitor 152 monitors files on a file system 154 to identify malicious data in the files. The file monitor 152 receives file data 156 for a particular file and analyzes the data using one or more finite automata 158. If the finite automata 158 indicate that the file data 156 matches a malicious pattern, the file monitor 152 can initiate a protection process 160. Example protection processes include warning a user that a file on his or her system may be dangerous or cleaning, deleting, or quarantining the file. The file monitor 152 initiates a cleaning process by initiating a process that will remove the malicious content from the file. The file monitor 152 initiates a deletion of a file by instructing the file system 154 to delete the file. The file monitor 152 initiates a quarantine of a file by instructing the file system 154 to prohibit access to the file. If the file monitor determines that the file data 156 not match any of the patterns represented by the finite automata 158, no protective processes are initiated.

The file monitor 152 can receive the file data, for example, as a stream of data generated during a scan of a file, e.g., a stream of data generated by an anti-virus software program. In some implementations, the file data is encrypted, compressed, or both, e.g., according to conventional encryption and compression techniques. In these implementations, the file monitor 152 can decrypt or de-compress the file data, as appropriate, for example, using conventional techniques.

§2.0 Example Finite Automaton

Figure 2A:
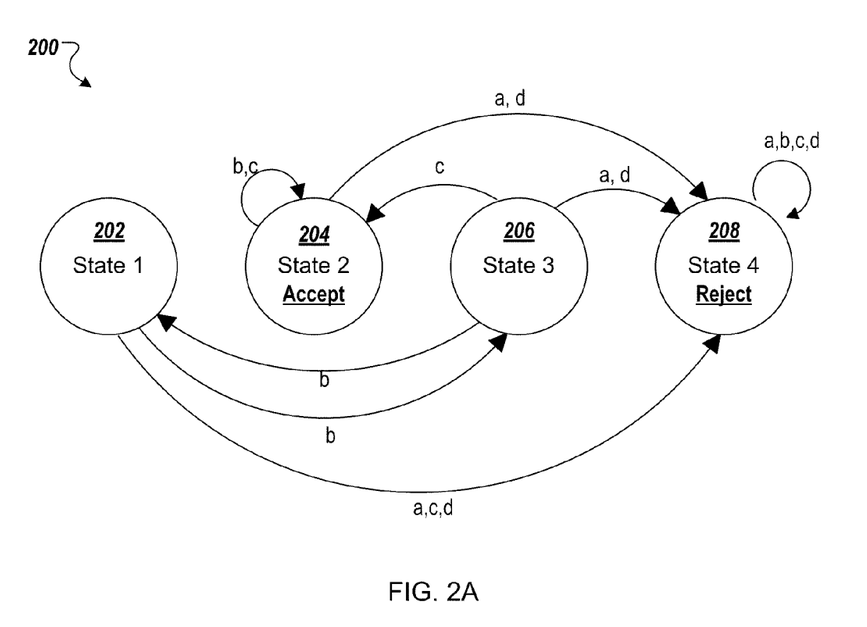
FIG. 2A is a graphical representation of an example finite automaton.

FIG. 2A is a graphical representation of an example finite automaton 200. The finite automaton 200 has four states, each state represented by a node in the graph. State 1 is represented by node 202, state 2 is represented by node 204, state 3 is represented by node 206, and state 4 is represented by node 208. Some of the states in the finite automaton correspond to actions that are taken in the states. For example, state 2 is an accept state, meaning that if the finite automaton 200 ends up in state 2, the input should be accepted as matching a pattern. State 4 is a reject state, meaning that if the finite automaton 200 ends up in state 4, the input should be rejected as not matching a pattern.

The finite automaton 200 has a current state which can be represented, for example, by data stored in a computer system implementing the finite automaton. The finite automaton 200 transitions between states based on the next input element in the input data being processed. The arrows shown in the graph in FIG. 2A illustrate the transitions between states on input elements. The next input element can be, for example, the next character in a file or the next character in network traffic. For simplicity, the finite automaton 200 processes input where each element of the input is one of "a," "b," "c," or "d." However, other finite automata can process a much larger number of input elements.

When the finite automaton 200 transitions between states, it updates its current state to be a next state determined from its current state and the input element that is processed, e.g., by updating the data stored in the computer system.

§2.1 Example Transition Table

Figure 2B:
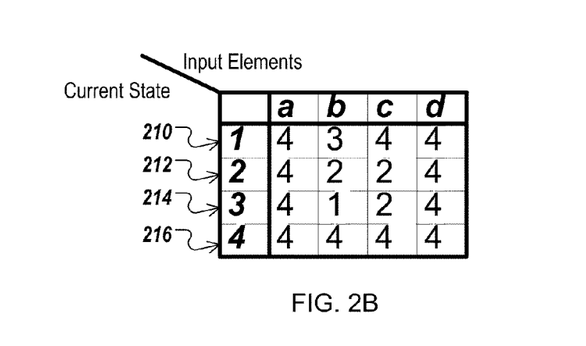
FIG. 2B illustrates example transition tables for each of the states of the finite automaton.

FIG. 2B illustrates example transition tables for each of the states of the finite automaton 200. State 1 is represented by transition table 210, state 2 is represented by transition table 212, state 3 is represented by transition table 214, and state 4 is represented by transition table 216. Each transition table stores, for the given state of the finite automaton 200, the next state that the finite automaton 200 will transition to upon receiving each of the possible input elements. For example, transition table 210 for state 1 indicates that, when the finite automaton is in state 1, it will transition to state 3 if it receives the input element "b," and otherwise will transition to state 4. Each transition table for the finite automaton is indexed according to the same deterministic indexing scheme. The indexing scheme corresponds to the possible input elements. For example, the transition tables can be indexed according to the American Standard Code for Information Interchange (ASCII) representations of the input characters.

Each transition table has a size on the order of the number of possible input elements. Storing the transition tables for all states of the finite automaton 200 thus requires storage space on the order of the number of states multiplied by the number of possible input elements. While this amount of storage is manageable when the number of states and the number of possible input elements is small, as the number of states and the number of possible input elements grows, the storage space quickly becomes difficult to manage.

Transition tables of a finite automaton, however, will often share many of the same transitions, resulting in overlap of the transition tables. For example, several different states may all transition to the reject state upon receipt of the same input element.

Figure 2C:
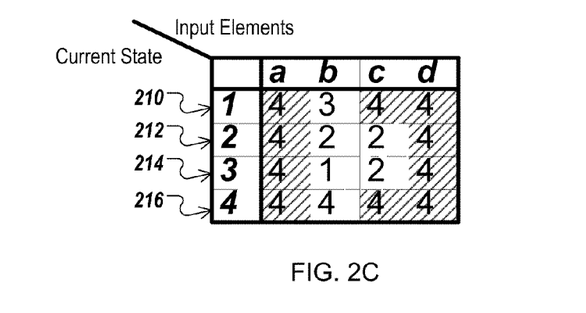
FIG. 2C illustrates the overlap between the transition tables.

FIG. 2C illustrates some of the overlap between the transition tables 210, 212, 214, and 216. All four transition tables indicate that upon receipt of an "a" or a "d" input element, the finite automaton 200 transitions to state 4. Furthermore, the transition tables for state 1 210, and state 4 216 both indicate that upon receipt of a "c" input element, the finite automaton 200 should also transition to state 4. The needed storage space for the transition tables can be reduced by generating condensed representations of the transition tables that take advantage of the overlap between the tables.

§2.2 Example Condensed Transition Table

Figure 2D:
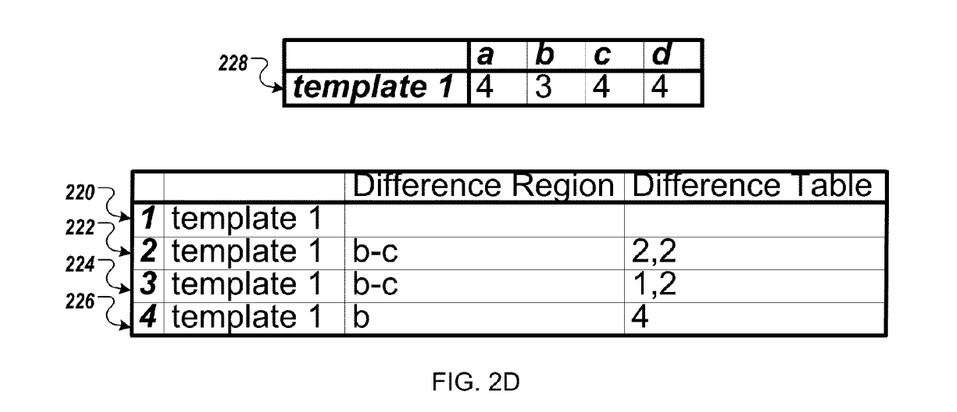
FIG. 2D illustrates example condensed representations of transition tables corresponding to the states of the finite automaton.

FIG. 2D illustrates example condensed representations 220, 222, 224, and 226 of transition tables corresponding to states 1, 2, 3 and 4, respectively. The condensed representations each make reference to transition table template 1 228. Transition table template 1 is the uncondensed transition table 210 for state 1.

The condensed representations also include an identification of the difference regions for each transition table. The difference region for a transition table is a contiguous region in the transition table that includes every next state in the transition table that is different from the corresponding next state in the transition table template for the transition table. The difference region may include some next states that are the same as the corresponding next states in the transition table template. The difference region runs from the lowest-indexed (according to the indexing scheme) next state in the transition table that is different from the corresponding next state at the same index in the transition table template to the highest-indexed (according to the indexing scheme) next state in the transition table that is different from the corresponding next state at the same index in the transition table template. For example, condensed transition table 222 corresponding to state 2 indicates that the uncondensed transition table 212 for state 2 is the same as the transition table template 228, except for the difference region corresponding to input elements b and c.

Each condensed representation also includes a difference table with the next states corresponding to the difference regions in the transition table. For example, the condensed transition table 222 for state 2 also includes a difference table indicating that the next states in the difference region should be 2 and 2.

The condensed representations of the transition tables can save storage space, e.g., by using the same transition table template for multiple transition tables. Accordingly, less space is needed to represent the finite automaton, and transition tables can be cached in smaller caches. This improved caching can increase performance at runtime, e.g., when the finite automaton is being used to determine whether input matches a character string of interest.

§3.0 Generating Condensed Representations of Transition Tables

The following description describes generating a condensed representation of a given transition table for a state of a finite automaton, and building a group of transition table templates for the finite automaton. The given transition table can be generated as appropriate for the pattern matching context of the finite automaton and the particular patterns being matched, for example, using conventional techniques.

Figure 3:
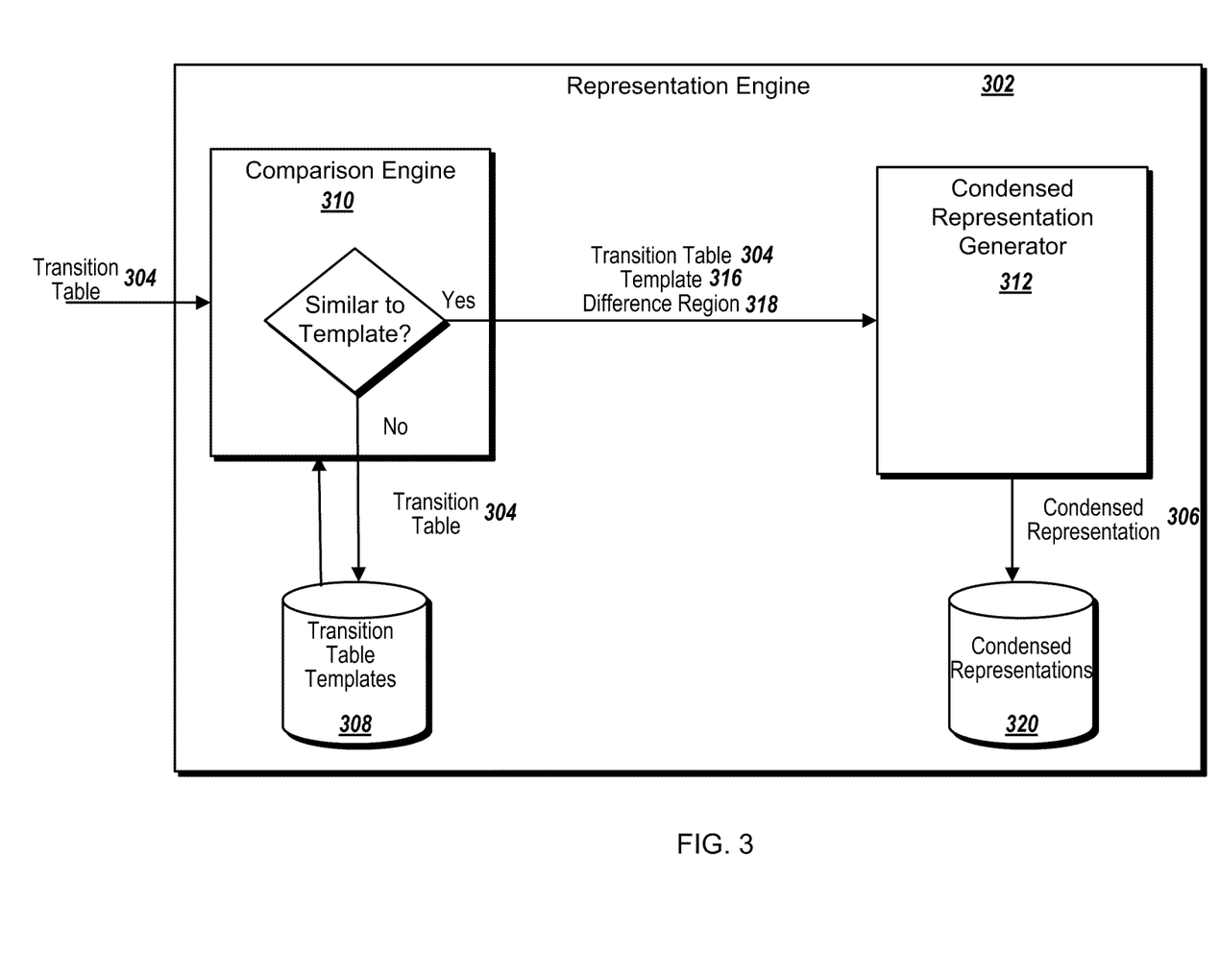
FIG. 3 is a block diagram of an example representation engine.

§3.1 Example Engine for Generating Condensed Representations of Transition Tables FIG. 3 is a block diagram of an example representation engine 302. The representation engine 302 receives a transition table 304 for a state of a finite automaton and either generates a condensed representation 306 of the transition table, or adds the transition table to a group of transition table templates 308, depending on whether the transition table 304 is similar to a transition table in the group of transition table templates 308. The transition table templates 308 are transition tables for other states in the finite automaton.

The representation engine 302 includes a comparison engine 310 and a condensed representation generator 312. The comparison engine 310 receives the transition table 304 and a group of transition table templates 308, and determines whether the transition table 304 is similar to a given transition table template in the group of transition table templates.

The comparison engine 310 identifies a difference region for the transition table 304 and the given transition table template. The difference region is a contiguous region of the transition table 304 that includes every next state in the transition table that is different from the corresponding next state in the given transition table template (as well as next states that are the same as the corresponding next state in the transition table template, but are between states that are different from their corresponding next states). For example, the comparison engine 310 can start from the first index in the transition table, and increment up through the table, comparing the next state stored at a particular index in the transition table to the corresponding next state stored at the same particular index in the given transition table template and then incrementing the particular index, until a next state at the particular index in the transition table does not match the next state at the particular index in the transition table template. The comparison engine 310 then identifies that particular index as the beginning of the difference region. The comparison engine 310 can also perform the same comparisons starting from the last index in the transition table and decrementing down through the table, until the comparison engine 310 identifies a next state stored at a particular index in the transition table that differs from its corresponding next state stored at the same index in the transition table template, and then identify the index of that next state as the end of the difference region. The difference region is the region between the begin index and the end index, inclusive. The comparison engine can identify the difference region by these two indices.

The comparison engine 310 then determines whether the size of the difference region satisfies, e.g., is below, a threshold size. The size of the difference region is the number of next states stored in the difference region of the transition table. The threshold size can be determined empirically. If the size of the difference region satisfies the threshold, the comparison engine 310 determines that the transition table is similar to the given transition table template.

If the comparison engine 310 determines that the transition table 304 is similar to a given transition table template in the group of transition table templates 308, the representation engine 302 provides the transition table 304, the given template 316, and an identification of the difference region 318 for the transition table 304 and the given template 316 to the condensed representation generator 312. The condensed representation generator 312 generates a condensed representation 306 for the transition table 304, and adds the condensed representation to a group of condensed representations 320 for other nodes in the finite automaton. The condensed representation includes a reference to the template 316, an identification of where the difference region 318 is in the transition table 304 (e.g., the begin and end indexes), and a difference table with the next states that are stored in the difference region 318 of the transition table 304. An example condensed representation described above with reference to FIG. 2D.

If the comparison engine 310 determines that the transition table 304 is not similar to any transition table template in the group of transition table templates 308, the representation engine 302 adds the transition table 304 to the group of transition table templates and does not generate a condensed representation for the transition table 304.

In some implementations, the comparison engine 310 selects the given transition table template being compared from the group of transition templates 308 by selecting the transition table template for which the transition table has the smallest difference region.

Figure 4:
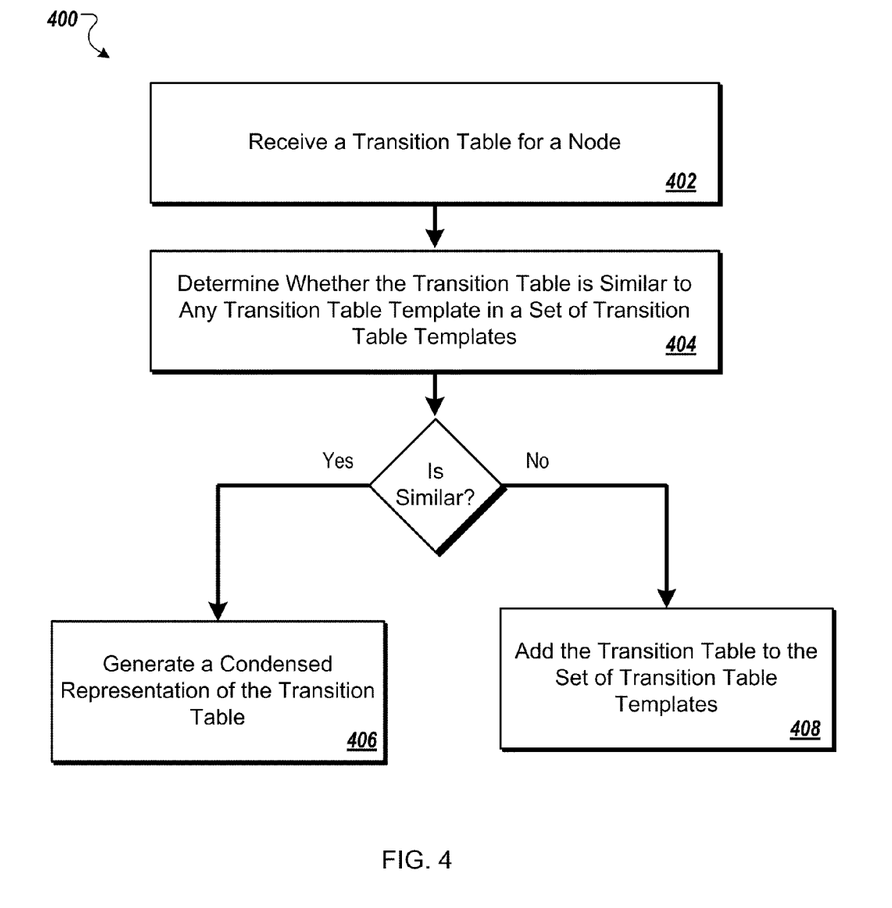
FIG. 4 is a flow diagram of an example process for generating condensed representations of transition tables.

§3.2 Example Process for Generating Condensed Representations of Transition Tables FIG. 4 is a flow diagram of an example process 400 for generating condensed representations of transition tables. The process 400 can be performed, for example, by the representation engine 302.

The process 400 receives a transition table for a node (402). The transition table can be, for example, one of the transition tables 210, 212, 214, or 216 described above with reference to FIG. 2B. The process 400 then determines whether the transition table is similar to any transition table template in a set of transition table templates (404), for example, as described above with reference to FIG. 3. If the process 400 determines that the transition table is similar to a given transition table template in the set of transition table templates, the system generates a condensed representation of the transition table (406), for example, as described above with reference to FIG. 3. Otherwise, the process 400 adds the transition table to the set of transition table templates (408), for example, as described above with reference to FIG. 3.

§4.0 Determining the Next State of a Finite Automaton Using Condensed Representations of Transition Tables Once condensed representations of transition tables are generated, the condensed representations can be used to determine the next state of a finite automaton, with little additional overhead compared to conventional techniques for determining the next state of a finite automaton.

Figure 5:
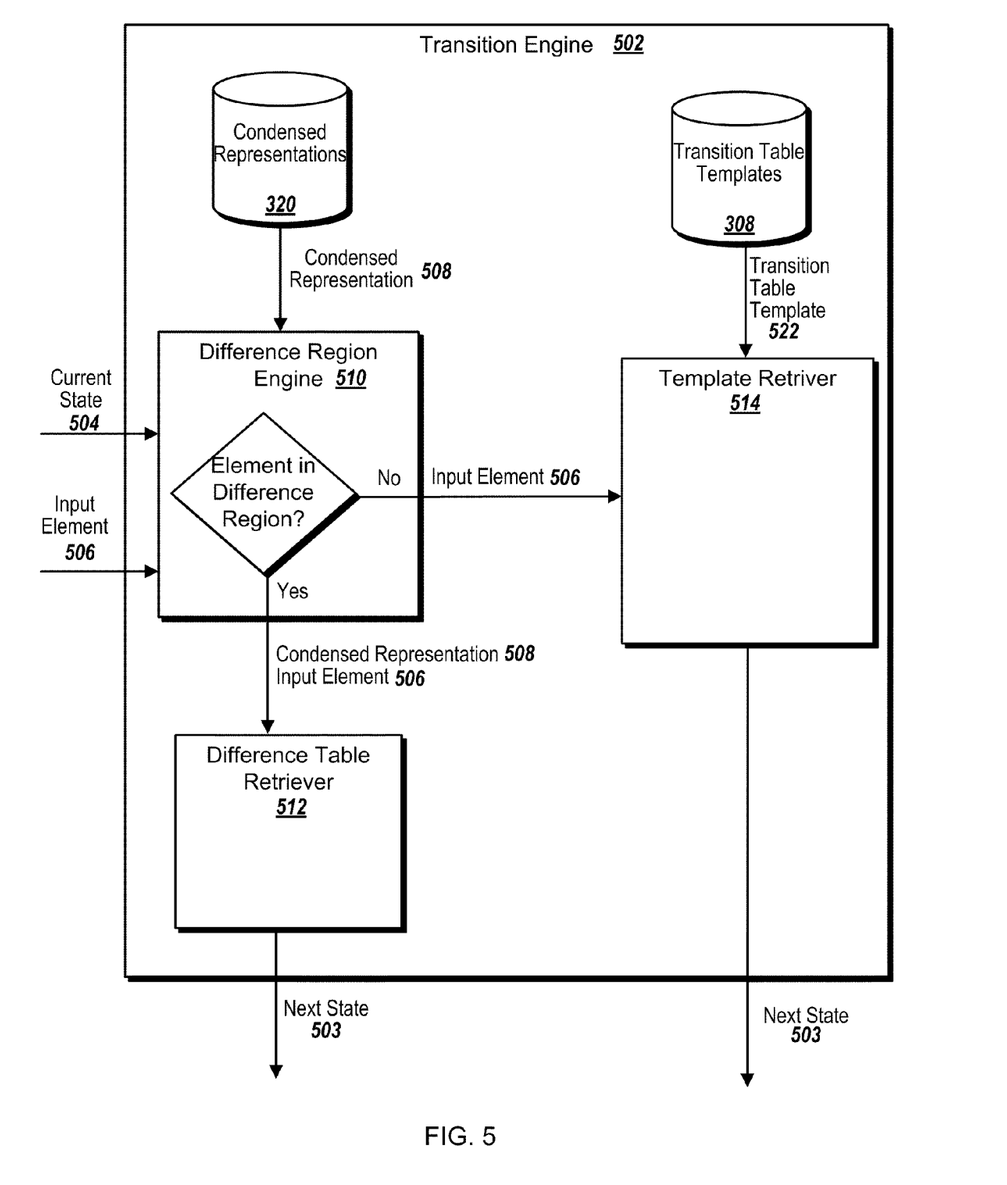
FIG. 5 is a block diagram of an example transition engine.

§4.1 Example Engine for Determining the Next State of a Finite Automaton Using Condensed Representations of Transition Tables FIG. 5 is a block diagram of an example transition engine 502. The transition engine 502 identifies the next state 503 in a finite automaton from the current state of the finite automaton 504 and an input element 506, using a condensed representation 508 of the transition table for the current state 504.

The transition engine includes a difference region engine 510, a difference region retriever 512, and a template retriever 514. The transition engine also has access to the condensed representations 320 and the transition table templates 308 that are generated by the representation engine 302.

The difference region engine 510 accesses the condensed representation 508 of the transition table corresponding to the current state of the finite automaton 504, and determines whether the next state corresponding to the input element 506 is stored in the difference region of the condensed transition table, or is stored in the transition table template corresponding to the condensed representation 508 of the transition table. The difference region engine 510 makes this determination by comparing the index corresponding to the input element to the indices in the difference region for the current state. If the index is one of the indices corresponding to the difference region, then the difference region engine 510 determines the next state is stored in the difference table. Otherwise, the difference engine 510 determines that the next state is stored in the transition table template.

For example, if the current state is state 2 as illustrated in FIG. 2, the condensed representation of the transition table is representation 222 illustrated in FIG. 2D, and the input element is "c," the difference region engine 510 would compare the index of the input element "c" to the indices of the difference region (corresponding to input elements "b" and "c"). Because the index for element "c" is between the begin and end indexes for "b" and "c", inclusive, the difference region engine 510 determines that the next state is stored in the difference region. Alternatively, if the input element is "a," the difference region engine 510 determines that the next state is not stored in the difference region, but instead is stored in the transition table template.

If the difference region engine determines that the element index is in the difference region, the transition engine 502 sends the condensed representation 508 of the transition table and the input element 506 to the difference region retriever 512. Otherwise, the transition engine 502 sends the transition table template 522 corresponding to the condensed representation 508 of the transition table and the input element 506 to the template retriever 514. The difference region retriever 512 or the template retriever 514 identifies the next state 503 of the finite automaton.

The difference region retriever 512 retrieves the next state from the difference table 518 corresponding to the difference region. The difference region retriever 512 adjusts the index used to retrieve the next state from the difference table by subtracting the begin index of the transition table from the index corresponding to the input element. This adjustment accounts for the difference region not including entries corresponding to indices up to the begin index. The difference region retriever 512 then retrieves the next state 503 stored in the difference table 518 at the adjusted index. For example, if the next states are indexed so that index 0 corresponds to input element "a," index 1 corresponds to input element "b," index 2 corresponds to input element "c," and index 3 corresponds to input element "d," the current state is state 2 illustrated in FIG. 2, and the input element is element "c," the difference region retriever 512 would retrieve the appropriate next state for the finite automaton as follows. The difference region retriever 512 would identify that the difference region runs from index 1 to index 2 (corresponding to elements "b" and "c.") The difference region retriever 512 would then adjust the index 2 corresponding to the input element "c" by subtracting 1 from the index, resulting in an adjusted index of 1. The difference region retriever 512 would then retrieve the next state stored in the different table at the region corresponding to the adjusted index.

The template retriever 514 identifies the next state by accessing the transition table template 522 corresponding to the transition table template for the condensed representation 508 from the group of transition table templates 308, and retrieving the next state 503 stored in the transition table template at the index corresponding to the input element 506. For example, if the next states are indexed so that index 0 corresponds to input element "a," index 1 corresponds to input element "b," index 2 corresponds to input element "c," and index 3 corresponds to input element "d," the current state is state 2 illustrated in FIG. 2, and the input element is element "a," the difference region retriever 512 would retrieve the next state stored in the transition table template at index 0.

Figure 6:
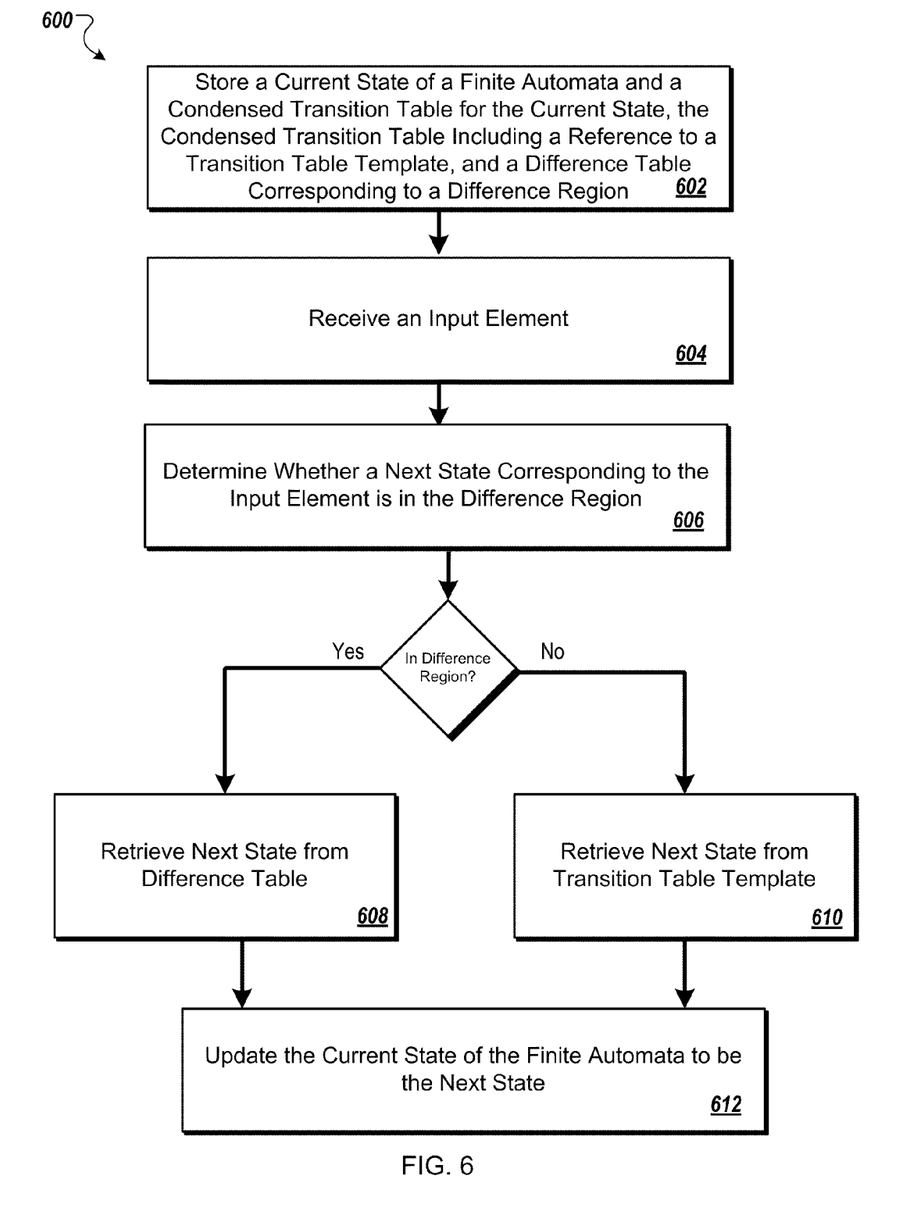
FIG. 6 is a flow diagram of an example process for identifying the next state of a finite automaton using condensed representations of transition tables.

§4.2 Example Process for Identifying the Next State of a Finite Automaton Using Condensed Representations of Transition Tables FIG. 6 is a flow diagram of an example process 600 for identifying the next state of a finite automaton using condensed representations of transition tables. The process 600 can be performed, for example, by the transition engine 502.

The process 600 stores a current state of a finite automaton and a condensed transition table template for the current state (602). The condensed transition table includes a reference to a transition table template, and a difference table corresponding to a difference region, for example, as described above with reference to FIG. 2D. The process 600 then receives an input element (604), for example, as described above with reference to FIG. 5. The process 600 then determines whether a next state corresponding to the input element is in the difference region for the condensed transition table (606), for example, as described above with reference to FIG. 5. If the next state is in the difference region, the process 600 retrieves the next state from the difference table (608), for example, as described above with reference to FIG. 5. If the next state is not in the difference region, the process 600 retrieves the next state from the transition table template (610), for example, as described above with reference to FIG. 5. The process 600 then updates the current state of the finite automaton to be the next state (612), e.g., by storing data indicating that the current state of the finite automaton is the next state.

In some implementations, the process 600 makes a determination about the input from the identified next state of the finite automaton. For example, the next state of the finite automaton can be an accept state, indicating that the input, as received so far, matches a pattern. When the next state of the finite automaton is an accept state, the process 600 can terminate the processing of the input data and immediately report the input as matching a particular pattern of interest. Alternatively, especially when it is possible to transition out of the accept state upon subsequent input, the process 600 can continue processing the input data until all input elements have been considered. At that point, if the finite automaton is still in the accept state, the process 600 reports the input as matching the particular pattern of interest. As another example, the next state of the finite automaton can be a reject state, indicating that the input does not and will not match any patterns represented in the finite automaton. When the next state of the finite automaton is a reject state, the process 600 can terminate the processing of the input data and report that the input does not match any of the patterns of interest. As yet another example, the next state of the finite automaton can be neither an accept state nor a reject state. In these implementations, the process 600 can continue processing the input data, as described above with reference to steps 602-612.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:

receiving, in a data processing apparatus, a transition table for a current state of a finite automaton, the finite automaton configured to match patterns in input data, the transition table storing, for each possible next element in the input data, a corresponding next state of the finite automaton;

determining, with the data processing apparatus, whether the transition table for the current state is similar to any transition table template in a set of transition table templates, each transition table template being a transition table for a respective different state of the finite automaton, where the transition table is similar to a transition table template when a difference region for the transition table and the transition table template has a size satisfying a threshold, the difference region being a contiguous region in the transition table containing all next states that are different from the corresponding next states in the transition table template;

in response to determining that the transition table is similar to a transition table template in the set of transition table templates, generating, with the data processing apparatus, a condensed representation of the transition table, the condensed representation including a reference to the similar transition table template, an identification of the difference region, and the next states in the difference region of the transition table; and in response to determining that the transition table is not similar to any transition table template in the set of transition table templates, adding, in the data processing apparatus, the transition table to the set of transition table templates.

2. The method of claim 1, wherein determining whether the transition table for the current state is similar to any transition table template further comprises:

selecting a transition table template from the plurality of transition table templates, the selected transition table template being the transition table template for which the transition table for the current state has the smallest difference region; and determining whether the size of the difference region for the transition table and the selected transition table template satisfies the threshold.

3. The method of claim 1, wherein the transition table for the current state is indexed according to a deterministic indexing scheme, where next states are indexed according to indices associated with input data elements, and determining whether the transition table for the current state is similar to any transition table in the set of transition table templates comprises, for a particular transition table template:

identifying a lowest index in the transition table having a corresponding next state that is different from a next state stored at the lowest index in the particular transition table template;
identifying a highest index in the transition table having a corresponding next state that is different from a next state stored at the highest index in the particular transition table template; and
determining that the transition table is similar to the particular transition table template if the difference between the highest index and the lowest index satisfies a threshold.

4. The method of claim 3, wherein the identification of the region of differences comprises an identification of the lowest index and the highest index.

5. The method of claim 1, wherein the input data corresponds to network traffic.

6. The method of claim 5, wherein the patterns are character strings indicative of a prohibited process.

7. The method of claim 5, wherein the patterns are associated with network protocols.

8. The method of claim 1, wherein the input data corresponds to a stream of characters generated while scanning a file.

9. A system, comprising:
a processor; and
a computer storage medium coupled to the processor and including instructions, which, when executed by the processor, causes the processor to perform operations comprising:
  receiving a transition table for a current state of a finite automaton, the finite automaton configured to match patterns in input data, the transition table storing, for each possible next element in the input data, a corresponding next state of the finite automaton;
  determining whether the transition table for the current state is similar to any transition table template in a set of transition table templates, each transition table template being a transition table for a respective different state of the finite automaton, where the transition table is similar to a transition table template when a difference region for the transition table and the transition table template has a size satisfying a threshold, the difference region being a contiguous region in the transition table containing all next states that are different from the corresponding next states in the transition table template;
  in response to determining that the transition table is similar to a transition table template in the set of transition table templates, generating a condensed representation of the transition table, the condensed representation including a reference to the similar transition table template, an identification of the difference region, and the next states in the difference region of the transition table; and
  in response to determining that the transition table is not similar to any transition table template in the set of transition table templates, adding the transition table to the set of transition table templates.

10. A non-transitory computer storage medium encoded with a computer program, the computer program comprising instructions that when executed by data processing apparatus cause the data processing apparatus to perform actions comprising:
  receiving a transition table for a current state of a finite automaton, the finite automaton configured to match patterns in input data, the transition table storing, for each possible next element in the input data, a corresponding next state of the finite automaton;
  determining whether the transition table for the current state is similar to any transition table template in a set of transition table templates, each transition table template being a transition table for a respective different state of the finite automaton, where the transition table is similar to a transition table template when a difference region for the transition table and the transition table template has a size satisfying a threshold, the difference region being a contiguous region in the transition table containing all next states that are different from the corresponding next states in the transition table template;
  in response to determining that the transition table is similar to a transition table template in the set of transition table templates, generating a condensed representation of the transition table, the condensed representation including a reference to the similar transition table template, an identification of the difference region, and the next states in the difference region of the transition table; and
  in response to determining that the transition table is not similar to any transition table template in the set of transition table templates, adding the transition table to the set of transition table templates.

11. A computer-implemented method, comprising:
storing, in a data processing apparatus, a current state of a finite automaton and a condensed transition table for the current state, the finite automaton configured to match patterns in input data, the condensed transition table indicating, for each possible next element in the input data, a corresponding next state of the finite automaton, the condensed representation including a reference to a transition table template, an identification of a difference region for the transition table and the transition table template, and a difference table storing the next states of the difference region of the transition table, where the difference region is a contiguous region in the transition table containing all next states that are different from the corresponding next states in the transition table template;
receiving, in the data processing apparatus, an input element;
determining, with the data processing apparatus, a next state for the finite automaton, the determining including:
  determining whether a next state corresponding to the input element is in the difference region;
  in response to determining that the next state corresponding to the input element is not in the difference region, retrieving the next state from the transition table template; and
  in response to determining that the next state corresponding to the input element is in the difference region, retrieving the next state from the difference table; and
updating the current state of the finite automaton to be the next state.

12. The method of claim 11, wherein:
the transition table, the transition table template, and the difference table are each indexed according to a deterministic indexing scheme, where next states are indexed according to indices associated with input elements, and
the identification of the difference region includes a lowest index in the transition table having a corresponding next state that is different from a next state stored at the lowest index in the transition table template, and a highest index in the transition table having a corresponding next state that is different from a next state stored at the highest index in the transition table template;

determining whether a next state corresponding to the input element is in the difference region comprises determining whether an index corresponding to the input element is between the lowest index and the highest index;

retrieving the next state from the transition table template comprises retrieving the next state from the transition table template at the index corresponding to the input element; and retrieving the next state from the difference table comprises retrieving the next state from the difference table at an index corresponding to the difference between the index corresponding to the input element and the lowest index.

13. The method of claim 11, further comprising:
receiving input data, the input data compressed according to a compression scheme;
decompressing the input data; and
identifying the input element from the decompressed input data.

14. The method of claim 11, further comprising:
receiving input data encrypted according to an encryption scheme;
decrypting the input data; and
identifying the input element from the decrypted input data.

15. The method of claim 11, further comprising:
determining that the next state indicates that the input data matches a predefined pattern; and
in response to the determination, initiating a protection process on a source of the input data.

16. The method of claim 15, further comprising terminating processing of the input data in response to the determination.

17. The method of claim 11, further comprising:
determining that the next state indicates that the input data matches a predefined pattern; and
modifying an analysis of network traffic in response to the determination.

18. The method of claim 11, further comprising:
determining from the next state that the input data does not match any of a group of predefined patterns represented by the finite automaton; and
in response to the determination, terminating processing of the input data.

19. A system, comprising:
a processor; and
a computer storage medium coupled to the processor and including instructions, which, when executed by the processor, causes the processor to perform operations comprising:
storing a current state of a finite automaton and a condensed transition table for the current state, the finite automaton configured to match patterns in input data, the condensed transition table indicating, for each possible next element in the input data, a corresponding next state of the finite automaton, the condensed representation including a reference to a transition table template, an identification of a difference region for the transition table and the transition table template, and a difference table storing the next states of the difference region of the transition table, where the difference region is a contiguous region in the transition table containing all next states that are different from the corresponding next states in the transition table template;
receiving an input element;
determining a next state for the finite automaton, the determining including:
determining whether a next state corresponding to the input element is in the difference region;
in response to determining that the next state corresponding to the input element is not in the difference region, retrieving the next state from the transition table template; and
in response to determining that the next state corresponding to the input element is in the difference region, retrieving the next state from the difference table; and
updating the current state of the finite automaton to be the next state.

20. A non-transitory computer storage medium encoded with a computer program, the computer program comprising instructions that when executed by data processing apparatus cause the data processing apparatus to perform actions comprising:
storing a current state of a finite automaton and a condensed transition table for the current state, the finite automaton configured to match patterns in input data, the condensed transition table indicating, for each possible next element in the input data, a corresponding next state of the finite automaton, the condensed representation including a reference to a transition table template, an identification of a difference region for the transition table and the transition table template, and a difference table storing the next states of the difference region of the transition table, where the difference region is a contiguous region in the transition table containing all next states that are different from the corresponding next states in the transition table template;
receiving an input element;
determining a next state for the finite automaton, the determining including:
determining whether a next state corresponding to the input element is in the difference region;
in response to determining that the next state corresponding to the input element is not in the difference region, retrieving the next state from the transition table template; and
in response to determining that the next state corresponding to the input element is in the difference region, retrieving the next state from the difference table; and
updating the current state of the finite automaton to be the next state.

21. An article of manufacture, comprising:
a non-transitory computer readable medium; and
information stored in the computer readable medium that, when processed by a computer, defines a data structure storing a condensed representation of a transition table for a current state of a finite automaton, the finite automaton configured to match patterns in input data, the transition table including, for each possible next element in the input data, a corresponding next state of the finite automaton, the data structure comprising:
a reference to a transition table template for the transition table;
an identification of a difference region for the transition table and the transition table template, the difference region being a contiguous region in the transition table containing all next states that are different from the corresponding next states in the transition table template; and the next states corresponding to the difference region in the transition table.

22. The article of manufacture of claim 21, wherein:

the transition table for the current state is indexed according to a deterministic indexing scheme, where next states are indexed according to indices associated with input data elements; and the identification of the difference region includes:

a lowest index in the transition table having a corresponding next state that is different from a next state stored at the lowest index in the transition table template; and a highest index in the transition table having a corresponding next state that is different from a next state stored at the highest index in the transition table template.

* * * * *